United States Patent
Ivanov

(10) Patent No.: US 7,373,249 B2
(45) Date of Patent: May 13, 2008

(54) AUTOMATIC MIRROR STABILIZATION

(75) Inventor: Yuri Ivanov, Arlington, MA (US)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 11/264,923

(22) Filed: Nov. 1, 2005

(65) Prior Publication Data

US 2006/0092534 A1 May 4, 2006

Related U.S. Application Data

(60) Provisional application No. 60/624,768, filed on Nov. 2, 2004.

(51) Int. Cl.
*G02B 5/08* (2006.01)
*G06F 19/00* (2006.01)

(52) U.S. Cl. .................. 701/213; 701/1; 701/49; 359/843; 340/556

(58) Field of Classification Search ............. 701/49, 701/200, 213, 211, 205, 208, 210, 1; 359/843, 359/854, 862, 865; 340/556, 995.17, 995.22; 348/118, 119, 129, 130, 135, 143; 455/414.2, 455/456.1
See application file for complete search history.

(56) References Cited

U.S. PATENT DOCUMENTS

| | | | | |
|---|---|---|---|---|
| 4,834,522 A | * | 5/1989 | Janowicz | 359/877 |
| 5,949,592 A | * | 9/1999 | Brandin | 359/843 |
| 6,154,328 A | * | 11/2000 | Welsch et al. | 359/877 |
| 6,176,587 B1 | * | 1/2001 | Fredricks | 359/843 |
| 6,405,112 B1 | * | 6/2002 | Rayner | 701/35 |

OTHER PUBLICATIONS

"Exploratory Computer Vision Group," [online] [Retrieved on Oct. 27, 2005] Retrieved from the Internet<URL:http://www.research.ibm.com/ecvg/>.

"Hardware and Performance," [online] [Retrieved on Oct. 27, 2005] Retrieved from the Internet<URL:http://vismod.media.mit.edu/vismod/demos/pfinder/hardware/>.

Paradiso, J. A., et al, "Optical Tracking for Music and Dance Performance," Fourth Conference on Optical 3D Measurement Techniques, ETH, Sep. 1997, pp. 1-8, Zurich, Switzerland.

"Real Time Tracking of the Human Body," [online] [Retrieved on Oct. 27, 2005] Retrieved from the Internet<URL:http://vismod.media.mit.edu/vismod/demos/pfinder/>.

"Segmentation and Classification," [online] [Retrieved on Oct. 27, 2005] Retrieved from the Internet<URL:http://vismod.media.mit.edu/vismod/demos/pfinder/classify/>.

(Continued)

*Primary Examiner*—Tan Q Nguyen
(74) *Attorney, Agent, or Firm*—Fenwick & West LLP; Mark Duell

(57) ABSTRACT

A system and a method are disclosed for automatically controlling the position of a mirror to stabilize the view in the mirror in spite of changes in viewing position. Initially, a mirror position is set by a user so that the user can comfortably view the reflection of a desired area. A tracking system estimates the user's viewing position. As a user's viewing position changes, the system reorients the mirror such that the reflection in the mirror is stabilized.

12 Claims, 10 Drawing Sheets

OTHER PUBLICATIONS

"Smart Rooms," Oct. 18, 1995, [online][Retrieved on Oct. 27, 2005] Retrieved from the Internet<URL:http://vismod.media.mit.edu/vismod/demos/smartroom/>.

"User Representation," [online] [Retrieved on Oct. 27, 2005] Retrieved from the Internet<URL:http://vismod.media.mit.edu/vismod/demos/pfinder/models/>.

Zhang, Z., "Flexible Camera Calibration by Viewing a Plane from Unknown Orientations," ICCV'99, 1999, pp. 666-673, Corfu, Greece.

Zhang, Z., "A Flexible New Technique for Camera Calibration," IEEE Transactions on Pattern Analysis and Machine Intelligence, Nov. 2000, pp. 1339-1334, vol. 22, No. 11.

* cited by examiner

1000

1002 — Initialization:

- 1004 — Determine the reference viewing position
- 1006 — Determine the pan and tilt values from the mirror drive
- 1008 — Determine $x$ and $y$
- 1010 — Determine $z$
- 1012 — Determine $\vec{V}, t, \vec{n}$
- 1014 — Determine $\vec{r}$
- 1016 — Determine initial conditions $x$

1018 — For each new video frame:

- 1020 — Determine new viewing position
- 1022 — Obtain iterative solution
- 1024 — Determine pan and tilt values for the mirror control to reposition the mirror

FIG. 10

AUTOMATIC MIRROR STABILIZATION

CROSS REFERENCE TO RELATED APPLICATIONS

This application claims priority under 35 USC § 119(e) to U.S. Provisional Patent Application No. 60/624,768 titled "Automatic Rear-View Mirror Stabilization" filed on Nov. 2, 2004, which is incorporated by reference herein in its entirety.

BACKGROUND OF THE INVENTION

1. Field of the Invention

The present invention generally relates to the field of control systems of mirrors of a car, and more specifically, to automatic stabilization of mirrors with respect to head position.

2. Description of the Related Art

Conventional mirror positioning systems allow car mirrors to be moved manually or by using electronic controls located on the dashboard or elsewhere in the interior of the car within easy reach of the user. Some conventional mirror positioning systems also offer the feature of saving one or more settings that allow customization to the driver. For example, when one driver positions the mirrors at a comfortable viewing angle, those settings can be saved by the system. Then, if that driver or another driver alters the positions of the mirrors, the mirrors can be returned to the positions corresponding to the saved settings at the touch of a button.

Despite these features, conventional mirror positioning systems remain limited in several ways. For example, the settings that can be saved in conventional mirror positioning systems are static. If the driver changes position in the seat, for example by slouching or shifting to one side or the other, the mirrors may no longer be at a desired angle to view the area behind the vehicle. In other words, as the driver shifts viewing position, what is seen in the reflection shifts as well. Accordingly, the driver's ability to perceive the space behind the vehicle that he set up the mirrors to view is impaired. To maintain the optimal view of the scene reflected in the mirror using conventional systems, the user must either retain precisely the same head position throughout an entire drive or repeatedly readjust mirrors. Maintaining the same head position throughout an entire drive, particularly a lengthy one, is uncomfortable and, in practice, not possible. It unduly restricts a driver's natural inclination to change posture periodically. On the other hand, repeatedly readjusting mirrors manually or by manipulating electronic controls while driving is dangerous because it takes the driver's attention away from the road.

Accordingly, there is a need for a system and process of positioning mirrors that is capable of automatically responding to changes in a driver's viewing position so that the view reflected in the mirror is stabilized over time.

SUMMARY OF THE INVENTION

The present invention includes a system and a method for automatically controlling the position of mirrors to stabilize the view in spite of changes in viewing position. Initially, a mirror position is set by a user so that the user can comfortably view a desired area, for example a portion of the area outside of a vehicle. A tracking system estimates the user's viewing position. As a user's viewing position changes, the system reorients the mirrors such that the apparent reflection in the mirror is stabilized.

According to one embodiment of the present invention, a method is used to automatically stabilize the view in a mirror as a user's viewing position changes. The user sets the mirror to a desired orientation to see a desired reflected area. The mirror stabilization is engaged. By tracking the user's head position, the system registers a change in the user's viewing angle. The system adjusts the position of the mirror so that the view of the desired reflected area is maintained. While engaged, the system continues to compensate for changes in the user's head position.

In order to operate effectively, the method above relies on the system being accurately calibrated such that any given change in view position will result in the appropriate corresponding change in the mirror position to keep the user's view in the mirror stabilized. According to one embodiment of the present invention, the tracking system provides three-dimensional coordinates of the user's head, for example by means of a camera. A calibration is performed so that the coordinate transformation between the camera and the mirror is known. An auxiliary mirror, rigidly attached to the camera, is calibrated. Then the camera-mirror system can be calibrated through the calibrated auxiliary mirror. Then the resulting transformation is augmented by reflection of the coordinate system of the mirror through the auxiliary plane. The control surface for the movement of the mirror is found. The solution to the control surface determines how the mirror should be adjusted to maintain a constant reflection in the mirror as the user's viewing position changes.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 10 is a flowchart of the method of stabilizing the view reflected in the mirror in accordance with one embodiment of the present invention.

DETAILED DESCRIPTION OF THE PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
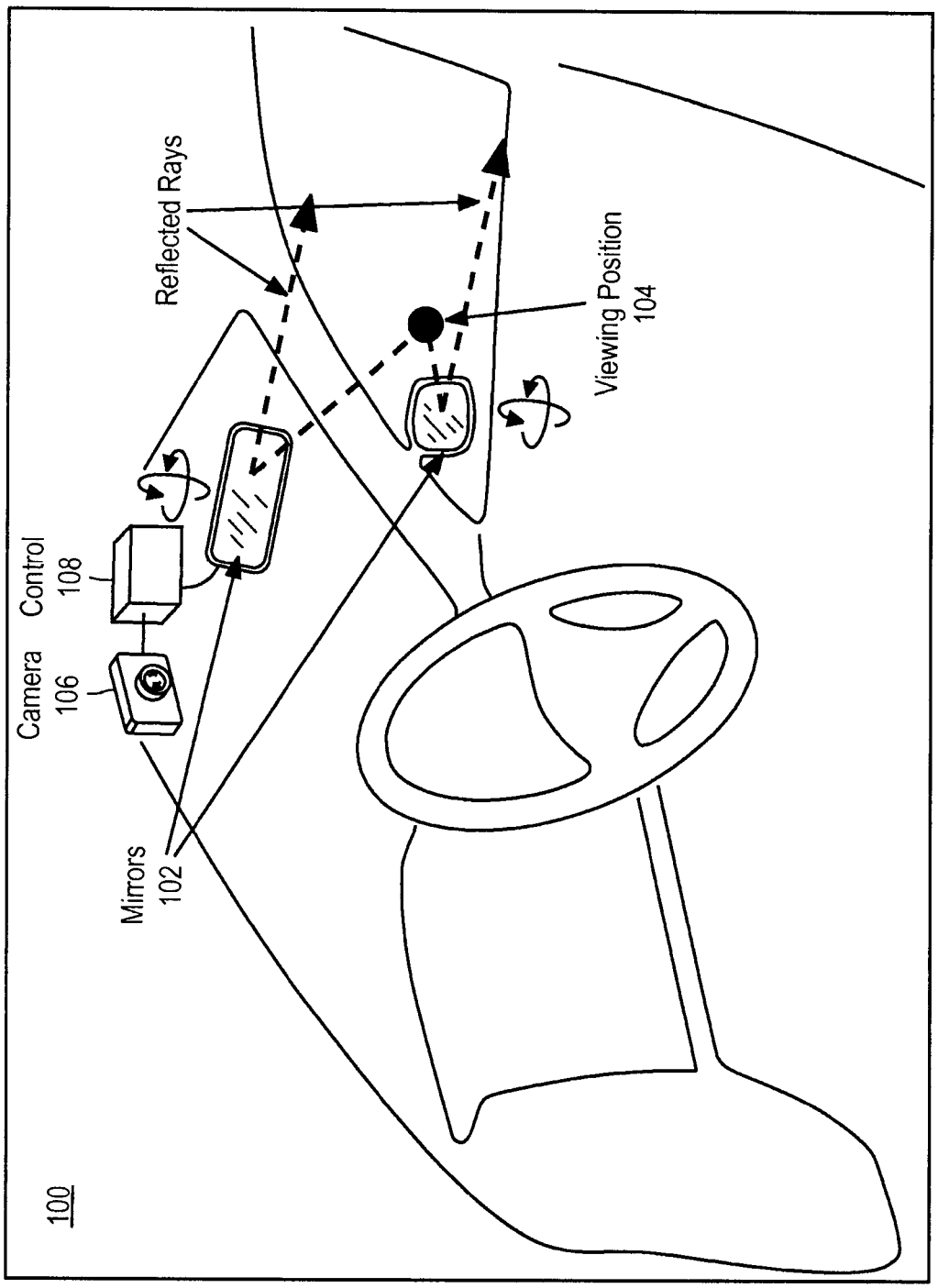
FIG. 1 illustrates a system used to automatically stabilize the view in a mirror in accordance with one embodiment of the present invention.

FIG. 1 shows a system 100 for automatically controlling the position of mirrors 102 to stabilize the reflected view in spite of changes in viewing position 104. In this embodiment, system 100 includes a camera 106 for tracking head position. Many systems are available that use cameras to provide three-dimensional coordinates of a user's head, such as pfinder (http://vismod.media.mit.edu/vismod/demos/pfinder/), and IBM 3D head tracking system (http://www.research.ibm.com/ecvg/lisab_proj/headtrack.html). A conventional single camera method can be employed based on learning the differential relations between the apparent head dimensions and the depth in a projective geometric system of the calibrated camera lens. In alternative embodiments, camera 106 can be any device for receiving an electromagnetic reflection, e.g., a radar system, or any optical system, that can determine head position. In this implementation, camera 106 is coupled to control 108. In one embodiment, control 108 comprises a computing device for controlling a mirror drive mechanism (not shown), for example, for controlling electronic mirror positioners. In one embodiment, the coupling between control 108 and a mirror drive mechanism in mirrors 102 comprises a wire connection. Alternatively, the coupling is a wireless connection. Preferably, control 108 interprets signals from camera 106, determines the change in viewing position, and alters the position of mirrors 102 to compensate for the change in viewing position. For the sake of clarity, the rest of the description will focus on a single-mirror system. It will be readily recognized that the systems and methods described herein may be employed in a system with more than one mirror without departing from the principles of the present invention.

Figure 2:
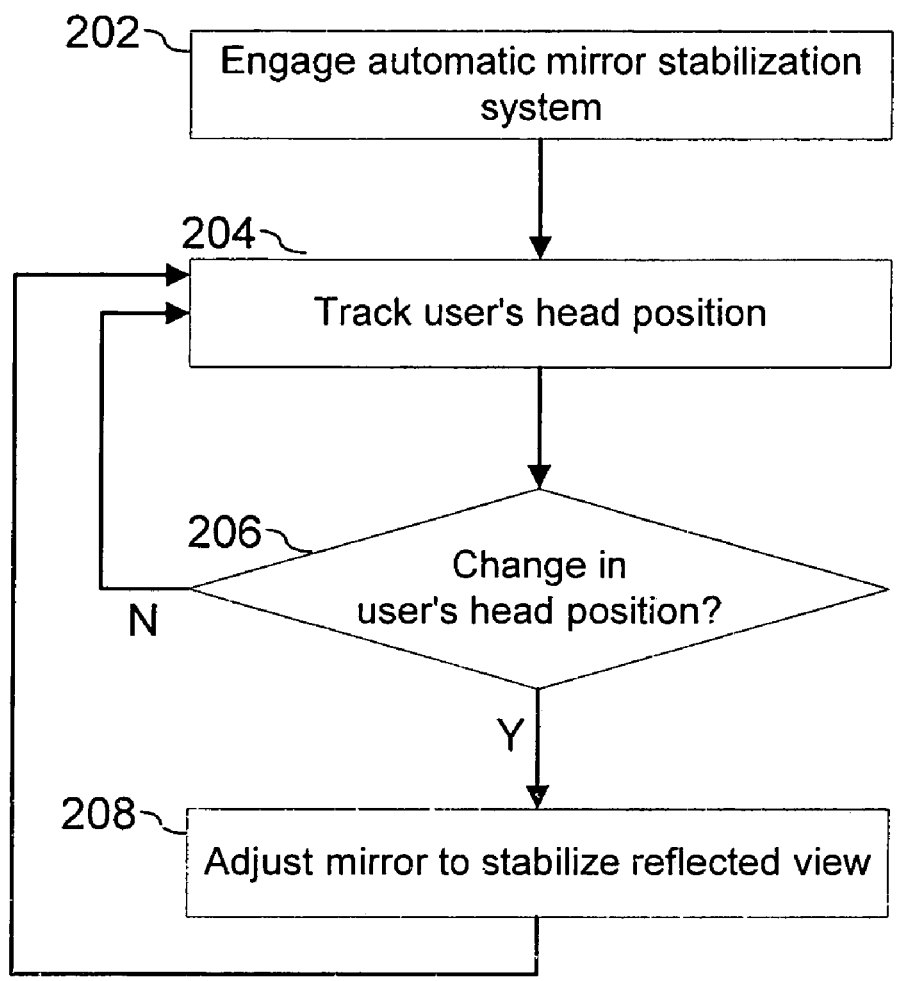
FIG. 2 is a flow chart of a method used to automatically stabilize the view in the mirror in accordance with one embodiment of the present invention.

FIG. 2 is a flow chart of a method 200 used to automatically stabilize the view in the mirror in accordance with one embodiment of the present invention. The method 200 begins by engaging 202 the automatic mirror stabilization system. In some embodiments, the system is engaged when the car is started. Alternatively, the system can be engaged by the user turning on the system separately from the car. In some embodiments, the user sets the mirrors at the desired position prior to engaging the system. In other embodiments, the user sets the mirrors at the desired position after the system has been engaged. In step 204, the system tracks the user's head position. In step 206, the system determines if there has been a change in the user's head position. A change in the user's head position corresponds to a change in the user's viewpoint 104. If there has not been a change in the user's head position, the system continues to track the user's head position. If there has been a change in the user's head position, the system adjusts 208 the mirror to stabilize the reflected view. Control 108 sends signals to the positioning devices of the mirrors to alter the position of the mirrors. Then the system returns to tracking 204 the user's head position. Preferably, the system is capable of responding to changes in the user's viewpoint rapidly enough to keep up with the user's shifting position, for example, on the order of less than a second. Preferably, the system continues to iteratively track 204 the user's head position and adjust 208 the mirror to compensate for the change until the automatic mirror stabilization system is disengaged.

Calibration

Figure 3:
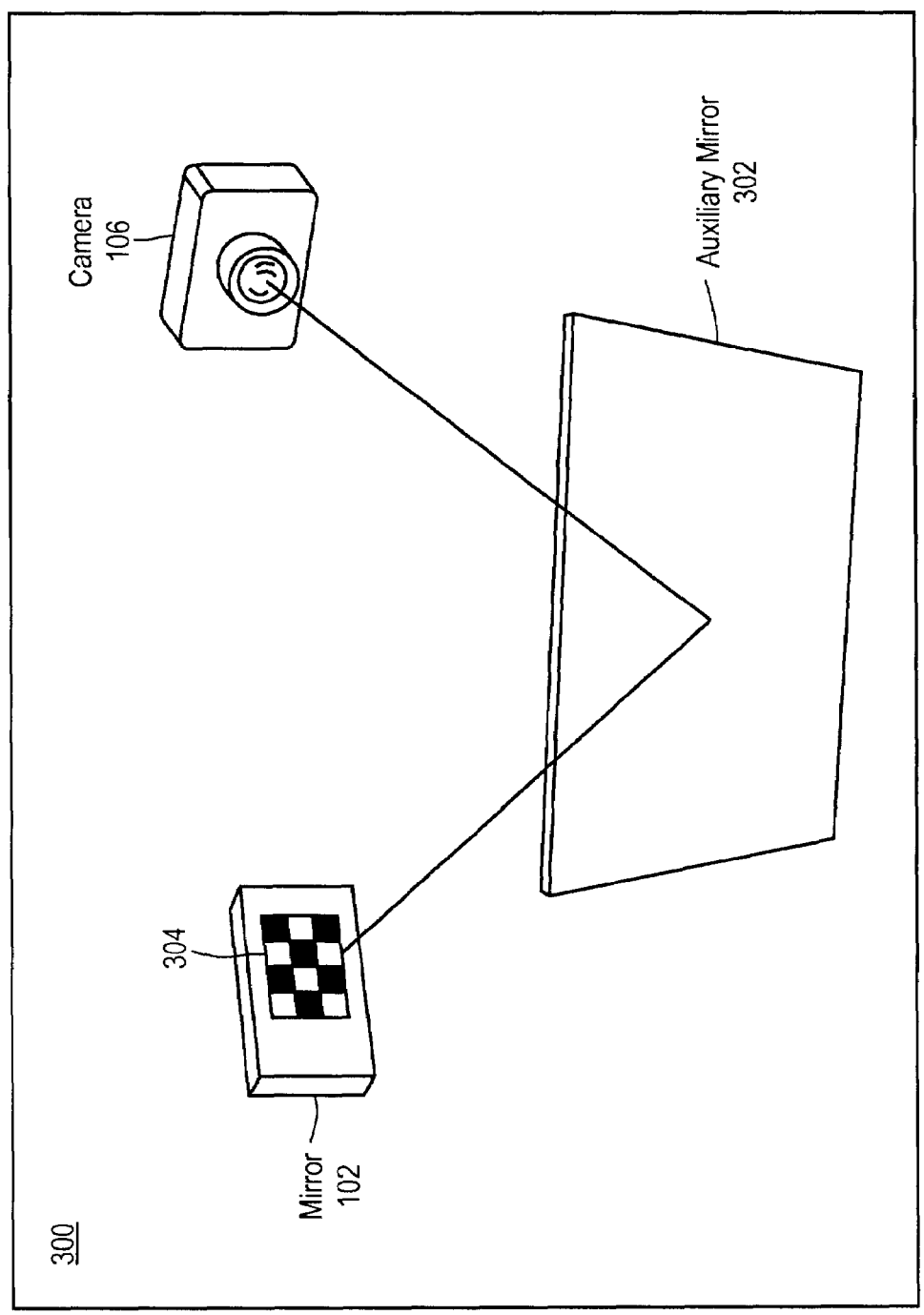
FIG. 3 illustrates a set-up used to calibrate the mirror control system according to one embodiment of the present invention.

Referring now to FIG. 3, there is shown a system 300 used to calibrate a mirror control system, according to one embodiment of the present invention. The system includes a camera 106, a mirror 102, and an auxiliary mirror 302. A camera 106 mounted in a car in a position suitable for observing the user's face typically cannot see the rear-view mirror, for example. Hence, an auxiliary mirror 302 is used to enable the camera 106 to view the mirror 102 as a reflection in the auxiliary mirror 302. In this setup, the camera-mirror system can effectively be calibrated through the calibrated auxiliary mirror 302, after which the resulting transformation is augmented by reflection of the coordinate system of the mirror through the auxiliary plane. The task of the calibration of the camera-mirror setup can be accomplished according to the method described in FIG. 4.

Figure 4:
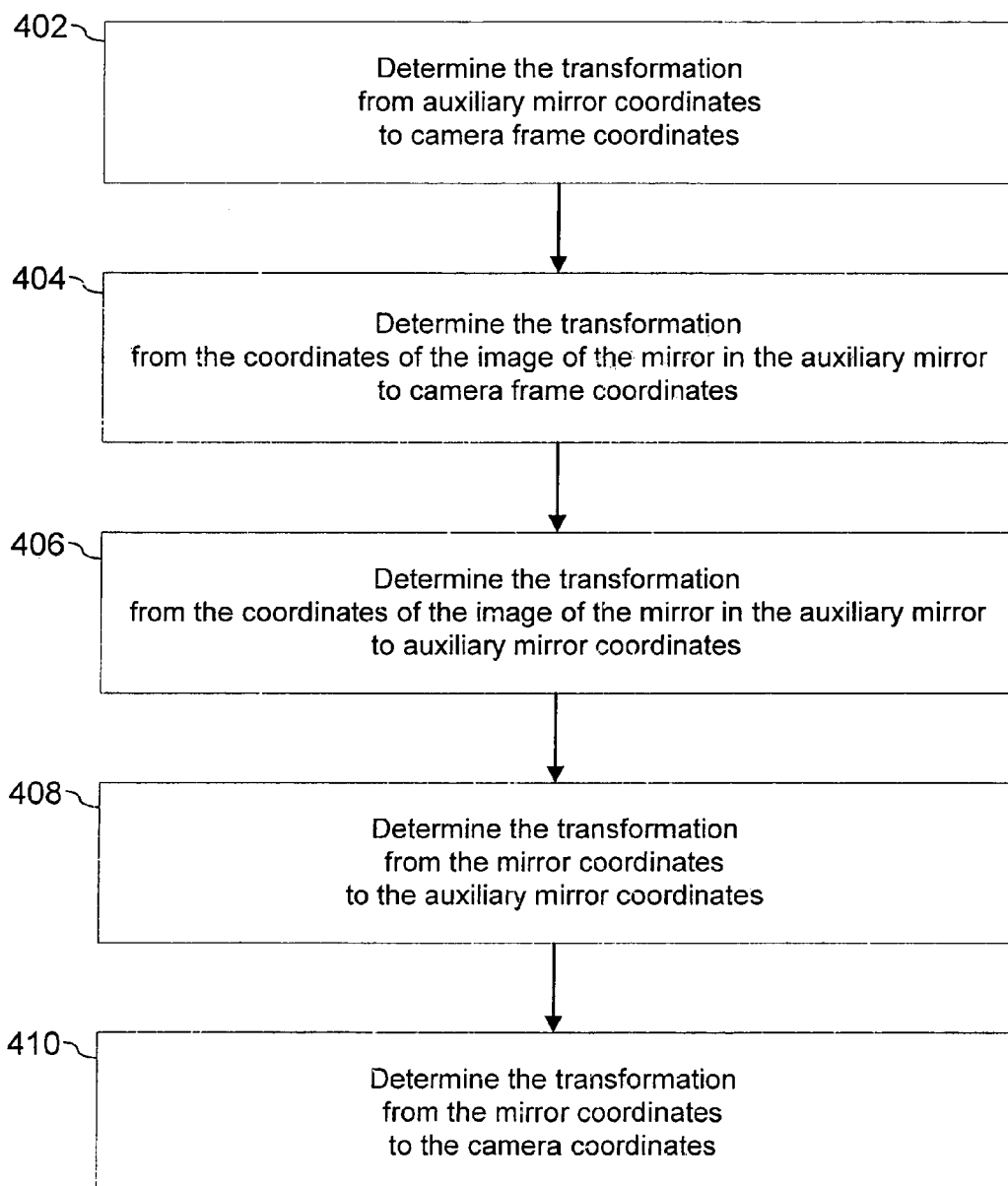
FIG. 4 is a flow chart of a method used to calibrate the mirror control system, according to one embodiment of the present invention.
Figure 5:
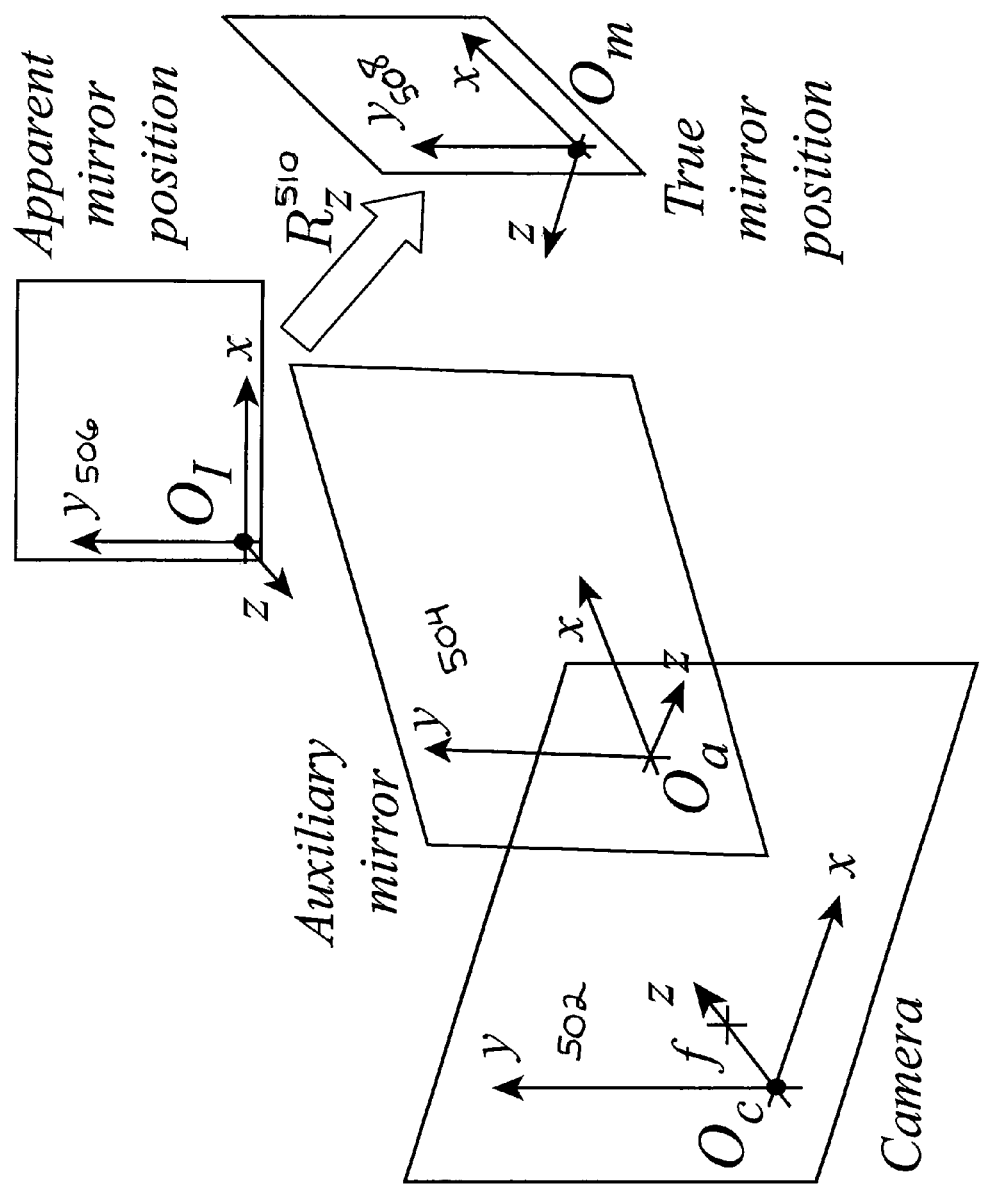
FIG. 5 illustrates the coordinate systems according to the calibration procedure used in one embodiment of the present invention.

FIG. 4 shows a flow chart of a method 400 used to calibrate the mirror control system, according to one embodiment of the present invention. In describing the calibration method 400 illustrated in FIG. 4, reference will be made to the coordinate systems of FIG. 5.

The task of the calibration of the camera-mirror setup can be formulated as follows: Given $T_a^c$ and $T_I^c$, find $T_m^c$, where indices c, a, I, and m stand for the camera coordinate system (c), the auxiliary mirror coordinate system (a), the coordinate system of the Image of the mirror in the auxiliary mirror (I), and the mirror coordinate systems (m), respectively. Notationally, the transformation from coordinate system a to coordinates system b is designated herein by $T_a^b$.

At the outset, $T_a^c$ is unknown. Thus, the first step in calibration is to determine 402 the transformation from auxiliary mirror coordinates 504 to camera frame coordinates 502. For this purpose, in one embodiment, a calibration pattern is placed directly on the auxiliary mirror surface. Using any traditional camera calibration technique, the coordinate transformation matrix, which represents the coordinate transformation from the auxiliary mirror coordinate system 504 to the camera frame coordinates system 502 is found:

$$T_a^c = [R_a^c | t_a^c] \tag{1}$$

$R_a^c$ is the matrix of rotation and $t_a^c$ is the translation between origins of the coordinate systems. For mathematical clarity, we will proceed in homogeneous 3D coordinates, where the transformation matrix is a 4 by 4 matrix formed as follows:

$$\mathcal{T}_a^c = \left[\frac{T_a^c}{0001}\right] = \left[\begin{array}{c|c} R_a^c & t_a^c \\ 000 & 1 \end{array}\right] \quad (2)$$

At the outset, $T_f^c$ is also unknown. Thus, the next step in the method 400 is to determine 404 the transformation from the coordinates of the image of the mirror in the auxiliary mirror to the camera frame coordinates. Similarly to the calibration of the auxiliary mirror, using the image of the mirror 102 through the auxiliary mirror 302 results in finding the parameters of the transformation from the coordinates of the image of the mirror in the auxiliary mirror to the camera coordinates, $T_f^c$.

The next step in method 400 is to determine 406 the transformation from the coordinates of the image of the mirror in the auxiliary mirror 506 to auxiliary mirror coordinates 504. $T_f^a$ can be determined from $T_f^c$ and $T_a^c$:

$$T_f^a = T_c^a T_f^c = (T_a^c)^{-1} T_f^c \quad (3)$$

Then, the transformation from the mirror coordinates 508 to the auxiliary mirror coordinates 504 is determined 408. A reflection matrix, $R_z$ 510, is applied to $T_f^a$ to move from the apparent mirror position coordinates 506 to the true mirror position coordinates 508. The reflection of $T_f^a$ through the XY plane of the auxiliary frame is found by reversing the Z direction with the reflection matrix $R_z$ 510:

$$\mathcal{R}_z = \begin{bmatrix} 1 & 0 & 0 & 0 \\ 0 & 1 & 0 & 0 \\ 0 & 0 & -1 & 0 \\ 0 & 0 & 0 & 1 \end{bmatrix} \quad (4)$$

Thus, the transformation from the mirror coordinates 508 to the auxiliary mirror coordinates 504 is found using the following equation:

$$T_m^a = R_z T_f^a \quad (5)$$

Lastly, the transformation from the mirror coordinates to the camera coordinates is determined 410. $T_m^c$ is found using the following equation.

$$T_m^c = T_a^c T_m^a (= T_a^c R_z (T_a^c)^{-1} T_f^c) \quad (6)$$

Thus, the calibration of the camera-mirror setup is complete. As described in the task formulation, given $T_a^c$ and $T_f^c$, $T_m^c$ has been found, using equation 6.

Estimation of Control Surface Parameters

Mirrors 102 are mounted on positioning units (not shown). For example, the positioning unit may be a pan-and-tilt unit. Such a unit is capable of sweeping some control surface that can range in shape from spherical to a more complicated curved surface due in part to misalignment of the axis and lateral displacement of the servo motors.

Figure 6:
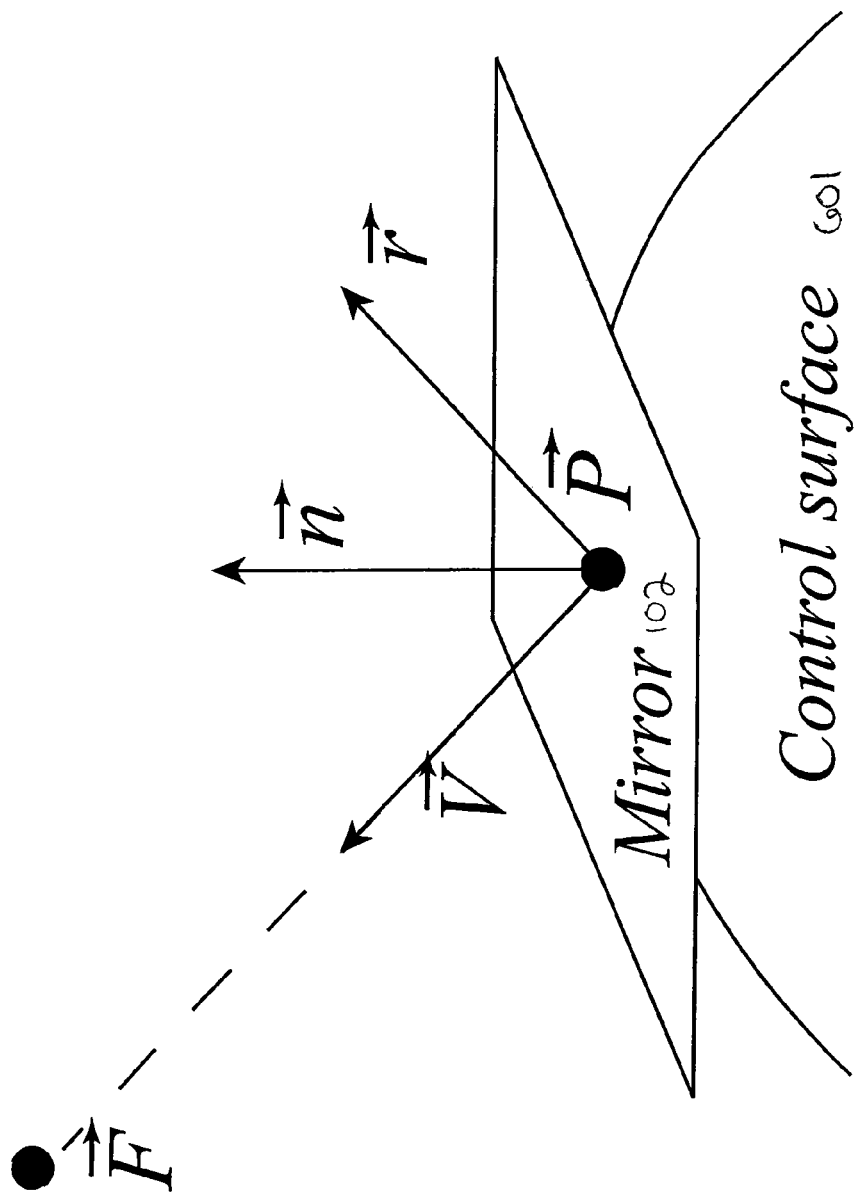
FIG. 6 illustrates a portion of the control surface of the mirror drive mechanism used in the system according to one embodiment of the present invention.
Figure 7:
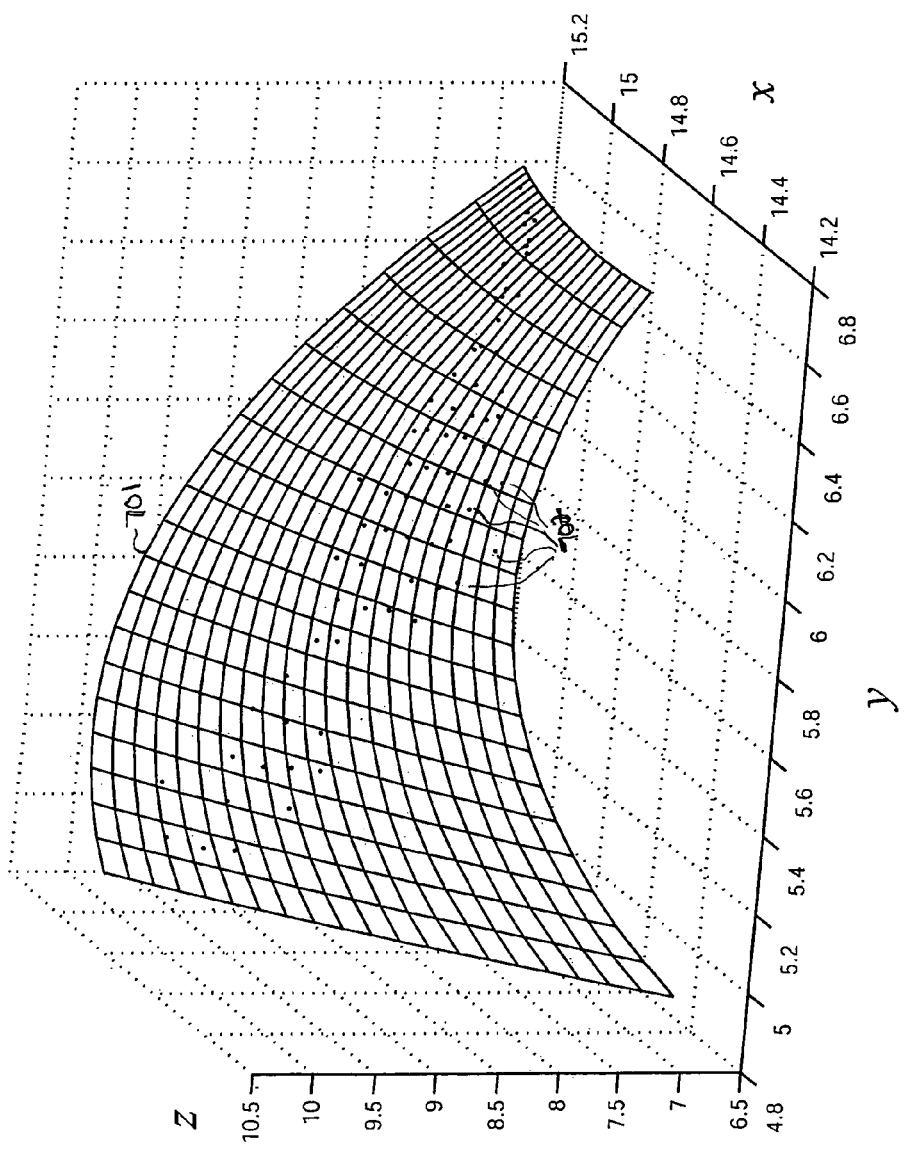
FIG. 7 is a graph of the control surface of the mirror drive mechanism.

FIG. 6 illustrates a portion of the control surface 601 of an example mirror drive mechanism used in the system according to one embodiment of the present invention. Control surface 601 comprises points for which the center point of mirror 102 can positioned. A three dimensional graph of an example control surface 702 derived from the inventors' experimental data is shown in FIG. 7. The dots 702 on the control surface 701 represent data points collected during the calibration process.

The control surface 601 can be approximated with a general quadratic surface that is described by a polynomial of a second degree:

$$z = a_1 x^2 + a_2 y^2 + a_3 xy + a_4 x + a_5 y + a_6 \quad (7)$$

A least squares approximation to this surface is found by fixing a point on the mirror during the calibration process and measuring its position while changing the mirror orientation. The corresponding coordinate transformation allows the computation of the position of this point in the camera coordinate system.

Let $p_m$ denote a position of such point in the mirror coordinate frame and $\tilde{p}_m$ denote its homogeneous coordinates. Then the point $\tilde{p}_{c,i}$ in the camera coordinates is computed with the corresponding transformation:

$$\tilde{p}_{c,i} = T_{m,i}^c \tilde{p}_m \quad (8)$$

Denoting the x, y and z components of the i-th point by $x_i, y_i, z_i$ respectively, the parameters of the surface given by equation 7 can be found as a quadratic regression:

$$Z = a^T D \quad (9)$$

where a is a 6-vector of coefficients and Z and D are formed as follows:

$$Z = [z_1 \; z_2 \; \ldots \; z_N] \quad (10)$$

$$D = \begin{bmatrix} x_1^2 & x_2^2 & \ldots & x_N^2 \\ y_1^2 & y_2^2 & \ldots & y_N^2 \\ x_1 y_1 & x_2 y_2 & \ldots & x_N y_N \\ x_1 & x_2 & \ldots & x_N \\ y_1 & y_2 & \ldots & y_N \\ 1 & 1 & \ldots & 1 \end{bmatrix} \quad (11)$$

The solution for the coefficients, a, is found in the least squares sense:

$$a^T = Z D^T (D D^T)^{-1} \quad (12)$$

Alternatively, the surface can also be computed in the mirror coordinates by first selecting one of the mirror frames as a basis, $T_{m*}^c$, and then transforming all collected points to that basis:

$$\tilde{p}_{m*,i} = T_c^{m*} T_{m,i}^c \tilde{p}_m = (T_{m*}^c)^{-1} T_{m,i}^c \tilde{p}_m \quad (13)$$

This approach may provide a better approximation in some geometrically degenerate cases, such as the case where the real surface is not a valid function of the coordinates.

Additionally, estimations can be made of the set of functions that allow the actual control signals for pan and tilt of the mirror drive mechanism to be derived:

$$\begin{cases} \text{pan} = P(x, y, z) \\ \text{tilt} = T(x, y, z) \end{cases} \quad (14)$$

The inverses of these functions are used to find the initial conditions:

$$\begin{cases} x = X(\text{pan, tilt}) \\ y = Y(\text{pan, tilt}) \end{cases} \quad (15)$$

In experiments conducted by the inventors, the last three functions have been found to be well approximated by the quadratic expansion similar to that of equation 11. However, the pan signal is sometimes more problematic. Thus, a $3^{rd}$ degree full polynomial expansion can be used:

$$\text{pan} = \sum_{p,q,r=0}^{3} a_{p,q,r} x^p y^q z^r \quad (16)$$

This equation represents a general polynomial where $a_{p,q,r}$ are the unknown coefficients of the terms $x^p y^q z^r$. These terms can be determined by taking a pseudo-inverse, similar to the solution of equation 12 above.

Iterative Solution for Mirror Position

Figure 8:
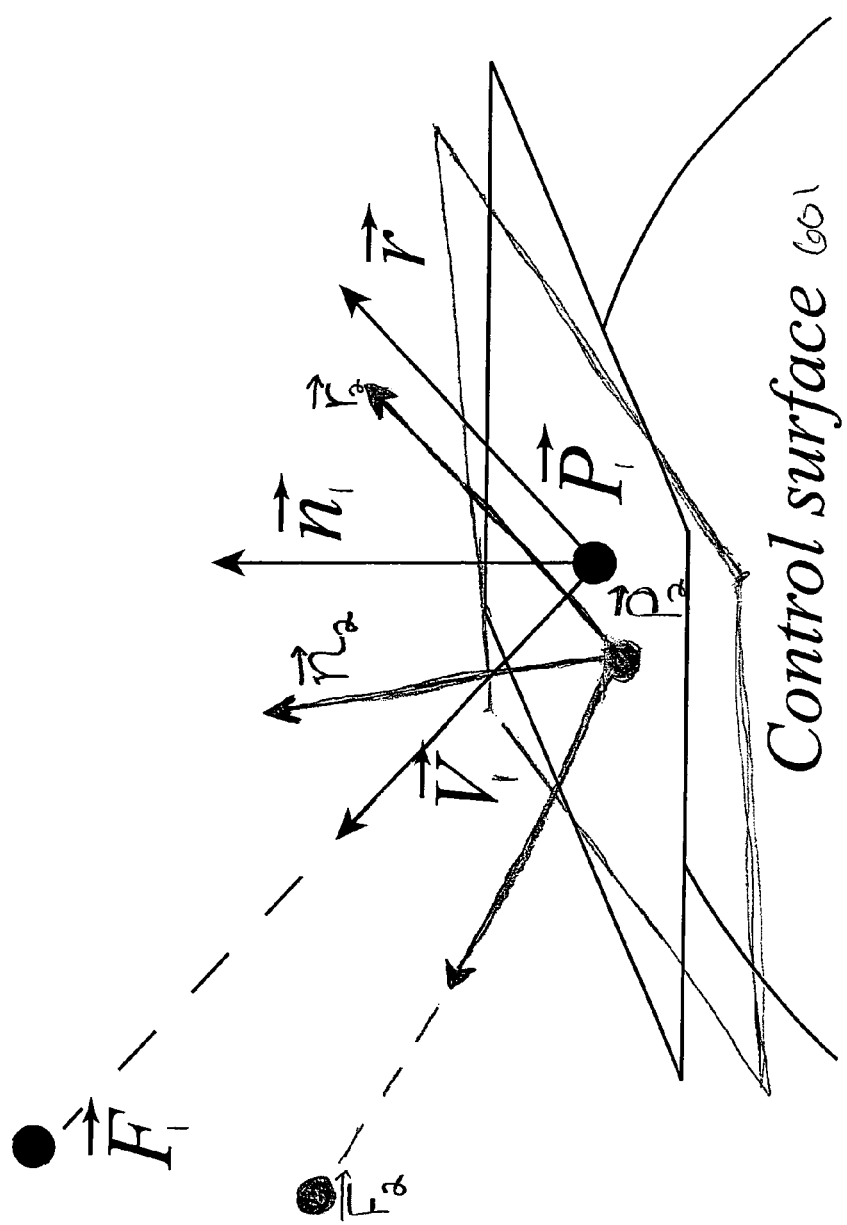
FIG. 8 illustrates a portion of the control surface of the mirror drive mechanism showing an initial position and an altered position of the mirror in response to an altered viewing position in order to stabilize the view in the mirror, indicated by parallel reflected rays.

Referring now to FIG. 6, there is shown a head position $\vec{F}$ and the reference reflection direction $\vec{r}$. For any new position $\vec{F}$, the solution for the appropriate mirror position is the position of the mirror center $\vec{P}$, on the control surface such that the resulting viewing vector $\vec{V}$ from $\vec{F}$ in the direction of $\vec{P}$, is reflected around the normal, $\vec{n}$, to be parallel with $\vec{r}$. As an example, FIG. 8 shows the solution $\vec{P}_2$ for the position of the mirror center on the control surface given the new head position $\vec{F}_2$ so that the reflection around the normal, $\vec{n}_2$, results in a ray, $\vec{r}_2$, that is parallel with $\vec{r}$. This indicates that the reflected vie has been maintained despite a change in viewing position.

Given the normal, $\vec{n}$, and the position of the mirror center, $\vec{P}$, the reference vector can be determined as follows:

$$\vec{r} = 2(\vec{V} \cdot \vec{n})\vec{n} - \vec{V} \quad (17)$$

The mirror position necessary to maintain the pre-set reflection direction, $\vec{r}$, can be found by specifying the head position $\vec{F}$, and solving the system of equations for the intersection of a ray through the point $\vec{F}$ with the control surface such that the reflected ray is parallel with $\vec{r}$.

The normal to the surface $z=f(x,y)$ is given by:

$$\vec{n} = \frac{\left[-\frac{\partial z}{\partial x}, -\frac{\partial z}{\partial y}, 1\right]^T}{\left\|\left[-\frac{\partial z}{\partial x}, -\frac{\partial z}{\partial y}, 1\right]^T\right\|} \quad (18)$$

The point of intersection $\vec{P}$ of the viewing ray with the control surface can be found from a joint solution to the parametric line equation, $\vec{P} = \vec{F} + \vec{V}t$, where $\vec{V}$ is a vector in the direction from $\vec{F}$ to $\vec{P}$ and the surface equation is given by equation 7. This is a system of 7 equations with 10 unknowns ($\vec{P}$, $\vec{V}$, t, and $\vec{n}$). Additionally, vector $\vec{V}$ is constrained to be of unit length and $\vec{r}$ is constrained to be a reflection of $\vec{V}$ through the surface normal $\vec{n}$. The resulting system of equations is:

$$\begin{cases} z = a_1 x^2 + a_2 y^2 + a_3 xy + a_4 x + a_5 y + a_6 \\ \vec{P} = \vec{F} + \vec{V}t \\ \vec{n} = \frac{\left[-\frac{\partial z}{\partial x}, -\frac{\partial z}{\partial y}, 1\right]^T}{\left\|\left[-\frac{\partial z}{\partial x}, -\frac{\partial z}{\partial y}, 1\right]^T\right\|} \\ \|\vec{V}\|^2 = 1 \\ \vec{V} \cdot \vec{n} = \vec{r} \cdot \vec{n} \\ [\vec{V}, \vec{n}, \vec{r}] = 0 \end{cases} \quad (19)$$

This is a system of 10 equations (lines 2 and 3 provide three constraints each) with 10 unknowns. The direct solution is difficult due to the presence of the quadratic terms in lines 1, 3, and 4. However, this system can be iteratively solved using the Newton-Raphson method, for example.

The Newton-Raphson solution to the system of equations given in 19 involves first transforming the system of equations to the homogeneous form, $$f(x) = 0 \quad (20)$$

Then starting with the initial guess, $x_0$, the solution is iteratively obtained as:

$$x_{n+1} = x_n - J^{-1} f(x_{n+1}) \quad (21)$$

Where the matrix J is the Jacobian of equation 20.

$$J = \begin{bmatrix} \frac{\partial f_1}{\partial f_1} & \cdots & \frac{\partial f_1}{\partial x_{10}} \\ \vdots & \ddots & \vdots \\ \frac{\partial f_{10}}{\partial x_1} & \cdots & \frac{\partial f_{10}}{\partial x_{10}} \end{bmatrix} \quad (22)$$

Equation 19 can be solved iteratively by means of recurrence of equation 21 setting $x_0$ to the known values initially set by the user:

$$x_0 = \begin{bmatrix} \vec{P}_r \\ \vec{V}_r \\ t_r \\ \vec{n}_r \end{bmatrix} \quad (23)$$

Figure 9:
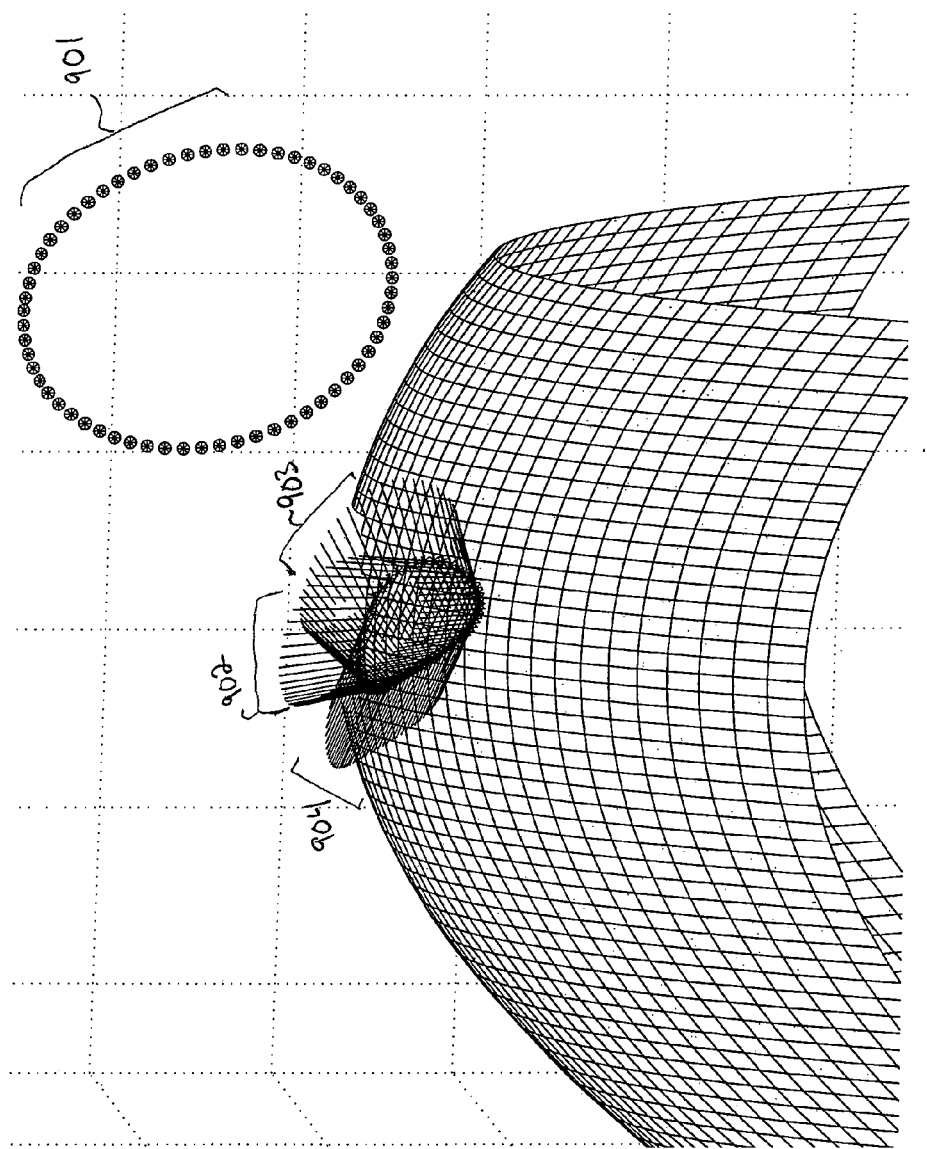
FIG. 9 illustrates a set of solutions, each solution generated from a distinct head position.

A set of solutions resulting from the initial set up and then changing the head position is shown in FIG. 9. In this figure, the viewing position changes along the circular pattern shown by a series of points 901 on the right. Each point induces a new set of the system parameters that are illustrated here. The surface normal originating from the point on the surface that provides the constant direction of the reflection rays 904 is designated by lines 902. Lines 903 show the viewing direction. These lines 903 correspond to $\vec{V}$ in FIGS. 4 and 6. Note that reflection rays 904 are all parallel to each other. Thus, the direction of the reflection is constant regardless of the viewing position.

Having found the required position $\vec{P}$ of the mirror center on the control surface, the values for pan and tilt controls of the mirror drive are determined via the approximation of equation 14. Thus, the mirror can be positioned appropriately to maintain the constant reflection direction.

Referring now to FIG. 10, there is shown a flow chart describing a method used to stabilize the view in a mirror, in accordance with one embodiment of the present invention. In describing the method 1000 shown in FIG. 10, reference will be made to the equations described above.

The method 1000 describes the steps of the system after the user has adjusted the mirror to a comfortable viewing angle. The method 1000 begins with initialization 1002 of the system. The starting viewing position is determined 1004. This point corresponds to where the user's viewpoint is, and is referred to in earlier figures as $\vec{F}$. Preferably, this reference point is obtained from a properly calibrated camera positioned to view the user's face. Then the initial pan and tilt values from the mirror drive are determined 1006. These values identify the starting position of the mirror after it has been comfortably adjusted for the user. In the next step, the values of x and y correspond to the starting position of the mirror on the control surface, are determined 1008, preferably by plugging the pan and tilt values taken from the mirror drive into the system of equations given in 15. Then z, the last coordinate corresponding to the starting position of the mirror on the control surface is determined 1010, preferably by plugging in the determined values of x and y into equation 7 which approximates the control surface. After the initial position of the mirror (x, y, and z) is determined, the viewing vector $\vec{V}$, the normal to the control surface $\vec{n}$, and t are determined 1012, preferably using lines 2 and 3 of the system of equations given in 19. In the next step, the reflection vector $\vec{r}$ is determined 1014, preferably using equation 17. Note that in equation 17, all the unknowns ($\vec{V}$ and $\vec{n}$) have already been determined. At this point, all of the components of the initial conditions $x_0$ from equation 23 have been determined and thus $x_0$ can be determined 1016. Thus concludes the initialization 1002 of the system.

Upon the completion of the initialization 1002, each of the steps of the method 1000 shown inside of box 1018 are completed for each new video frame. The new viewing position is determined 1020. Preferably, the new viewing position is determined in a similar manner as was used to determine the reference viewing position described above with reference to step 1004. If the new viewing position is the same as the previous viewing position, then no alterations are necessary to the mirror position and the method is complete for that video frame. However, if the new viewing position for a video frame is a change in position from the previous viewing position, then the method proceeds with the next steps in box 1018. The iterative solution to the system of equations 19 is obtained 1022, preferably by iterating equation 21, beginning with $x_0$, until convergence is achieved. Then, the pan and tilt values for the mirror drive to reposition the mirror is determined 1024. These pan and tilt values are preferably determined using the system of equations given in equation 14. These pan and tilt values position the mirror according to the iterative solution obtained. This compensates for the change to the new viewing position determined in step 1020 such that the reflected view is stabilized.

Upon reading this disclosure, those of skill in the art will appreciate still additional alternative structural and functional designs for a system and a process for automatically controlling the position of mirrors to stabilize the view in spite of changes in viewing position through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for stabilizing a first view in a first mirror, the method comprising the steps of:
    identifying the first view in the first mirror with respect to a first viewpoint of a user;
    automatically tracking a change in viewpoint of said user to a second viewpoint; and
    automatically adjusting a position of the first mirror in response to said change in viewpoint so that substantially the first view is presented to said user when said user is at said second viewpoint.

2. The method of claim 1, wherein the first mirror comprises a rear-view mirror.

3. The method of claim 1, wherein said user comprises a driver of a motor vehicle.

4. The method of claim 1, wherein automatically tracking a change in viewpoint of said user comprises monitoring a head position of said user with a camera.

5. The method of claim 1, wherein adjusting the position of the first mirror comprises controlling electronic mirror positioners.

6. The method of claim 1, further comprising:
    determining a transformation from a coordinate system associated with the first mirror to a coordinate system associated with a camera;
    determining a transformation from a coordinate system associated with an image of a second mirror in the first mirror to said coordinate system associated with said camera;
    determining a transformation from said coordinate system associated with said image of the first mirror in said second mirror to a coordinate system associated with said second mirror;
    determining a transformation from said coordinate system associated with said second mirror to said coordinate system associated with the first mirror; and
    determining a transformation from said coordinate system associated with said second mirror to said coordinate system associated with said camera.

7. The method of claim 6, wherein said second mirror comprises an auxiliary mirror temporarily in a fixed position relative to said camera.

8. A method for maintaining a substantially constant reflection direction in a mirror despite a change from a first viewpoint to a second viewpoint, the method comprising the steps of:

identifying a first reflection direction in the mirror having a first position, the first reflection direction determined from the first viewpoint and the first position of the mirror;

automatically tracking a change in viewpoint from the first viewpoint to the second viewpoint; and responsive to said change in viewpoint, automatically reorienting the mirror from said first position to a second position, wherein the second viewpoint and said second position determine a second reflection direction, wherein said second reflection direction is substantially parallel to said first reflection direction.

9. The method of claim 8, wherein the mirror comprises a rear-view mirror.

10. The method of claim 8, wherein automatically tracking a change in viewpoint from the first viewpoint to the second viewpoint comprises monitoring with a camera a head position of a user.

11. The method of claim 8, wherein automatically reorienting the mirror from said first position to said second position comprises sending a signal to a positioning device of the mirror.

12. A system for stabilizing a first view in a mirror, the system comprising:

a first camera positioned to observe changes in a viewing position of a user;

a control coupled to said camera; and a mirror coupled to said control, wherein said mirror is positioned responsive to observed changes in said viewing position of said user to maintain a substantially constant first view.

* * * * *